(12) United States Patent
Mielenz et al.

(10) Patent No.: US 10,691,963 B2
(45) Date of Patent: Jun. 23, 2020

(54) METHOD FOR LOCATING A VEHICLE

(71) Applicant: Robert Bosch GmbH, Stuttgart (DE)

(72) Inventors: Holger Mielenz, Ostfildern (DE); Jan Rohde, Stuttgart (DE)

(73) Assignee: Robert Bosch GmbH, Stuttgart (DE)

(*) Notice: Subject to any disclaimer, the term of this patent is extended or adjusted under 35 U.S.C. 154(b) by 189 days.

(21) Appl. No.: 15/803,123

(22) Filed: Nov. 3, 2017

(65) Prior Publication Data

US 2018/0129890 A1 May 10, 2018

(30) Foreign Application Priority Data

Nov. 4, 2016 (DE) .................. 10 2016 221 688

(51) Int. Cl.
*G05D 1/02* (2020.01)
*G06F 17/10* (2006.01)
*G06G 7/78* (2006.01)
*G06K 9/00* (2006.01)
*G01S 5/02* (2010.01)
(Continued)

(52) U.S. Cl.
CPC ......... *G06K 9/00825* (2013.01); *G01C 21/32* (2013.01); *G01N 15/1475* (2013.01); *G01S 5/0263* (2013.01); *G01S 19/51* (2013.01); *G05D 1/0088* (2013.01); *G05D 1/0229* (2013.01); *G01S 13/86* (2013.01); *G01S 13/931* (2013.01);
(Continued)

(58) Field of Classification Search
CPC ............. G06K 9/00825; G01C 21/32; G01N 15/1475; G01S 5/0263; G01S 19/51; G01S 12/86; G01S 13/931; G01S 13/42; G01S 13/90; G05D 1/0088; G05D 1/0229; G05D 1/0246; G05D 1/0274; G05D 1/0278
USPC ....................................................... 701/300
See application file for complete search history.

(56) References Cited

U.S. PATENT DOCUMENTS

2017/0030722 A1* 2/2017 Kojo .................. G05D 1/0268
2017/0307746 A1* 10/2017 Rohani ................. G01S 13/42
2018/0031375 A1* 2/2018 Deng .................. G01C 15/002

FOREIGN PATENT DOCUMENTS

JP   2003524775 A   8/2003
WO  2015/156821 A1  10/2015

OTHER PUBLICATIONS

Heigele et al., "Accurate and fast localization in unstructured environment . . . based on shape context keypoints," in Information Fusion (FUSION), 2014 17th International Conference, Jul. 7-10, 2014, 1-7.
(Continued)

*Primary Examiner* — Mahmoud S Ismail
(74) *Attorney, Agent, or Firm* — Norton Rose Fulbright US LLP; Gerard Messina

(57) ABSTRACT

A method for locating a vehicle, including the following steps: sensorial detection of first surroundings objects by the vehicle; locating the vehicle by reconciling data of the sensorially detected first surroundings objects with map data of a first digital map, in the case in which reconciliation of the data of the first surroundings objects with the map data of the first digital map to a defined extent is not possible, a second digital map for a local surroundings of the vehicle being created and location of the vehicle being carried out using the second digital map, data from second surroundings objects of an ascertaining device, which are conveyed from
(Continued)

the ascertaining device to the vehicle, being used for creation of the second digital map.

8 Claims, 3 Drawing Sheets

(51) Int. Cl.
  *G01C 21/32* (2006.01)
  *G01N 15/14* (2006.01)
  *G01S 19/51* (2010.01)
  *G05D 1/00* (2006.01)
  *G01S 13/86* (2006.01)
  *G01S 13/931* (2020.01)
(52) U.S. Cl.
  CPC .... *G01S 2013/9323* (2020.01); *G05D 1/0274* (2013.01); *G05D 2201/0213* (2013.01)

(56) References Cited

OTHER PUBLICATIONS

Rohde et al., "Model-Based Derivation of Perception Accuracy Requirements for Vehicle Localization in Urban Environments," in Intelligent Transportation Systems (ITSC), 2015 IEEE 18th International Conference, Sep. 18, 2015, pp. 712-718.

Meyer-Delius et al., "Temporary maps for robust localization in semi-static environments," in Intelligent Robots and Systems (IROS), 2010 IEEE/RSJ International Conference, Oct. 18-22, 2010, pp. 5750-5722.

Zou et al., "Sensor deployment and target localization based on virtual forces," in INFOCOM 2003, Twenty-Second Annual Joint Conference of the IEEE Computer and Communications—IEEE Societies, vol. 2, pp. 1293-1303, vol. 2, 2003.

* cited by examiner

METHOD FOR LOCATING A VEHICLE

CROSS REFERENCE

The present application claims the benefit under 35 U.S.C. § 119 of German Patent Application No. DE 102016221688.0 filed on Nov. 4, 2016, which is expressly incorporated herein by reference in its entirety.

FIELD

The present invention relates to a method for locating a vehicle. The present invention furthermore relates to an ascertaining device for furnishing location data for a vehicle. The present invention furthermore relates to a vehicle.

BACKGROUND INFORMATION

Numerous modern advanced driver assistance systems (ADAS), and in particular highly automated vehicle systems for urban automated driving (UAD), require sufficiently accurate vehicle localization or location. Localization systems that use a global localization map (e.g. retrievable from a back-end server), and a local localization map from an environmental model of the vehicle system, are often utilized in this context.

Localization approaches, for example described in C. Heigele, H. Mielenz, J. Heckel, D. Schramm, "Accurate and fast localization in unstructured environment . . . based on shape context keypoints," in Information Fusion (FUSION), 2014 17th International Conference, Jul. 7-10, 2014, 1-7, use localization maps, and use map-matching algorithms that are optimized for the intended application, to determine a map-relative vehicle posture (position and orientation of the vehicle).

In most cases, maximally computation-efficient algorithms having a deterministic runtime behavior are preferred. For landmark-based localization relative to a global localization map, for example, the closed solution to the so-called "Procrustes problem" can be used in order to calculate the transformation between a local and a global localization map, as described, e.g., in J. Rohde, J. E. Stellet, H. Mielenz, J. M. Zollner, "Model-Based Derivation of Perception Accuracy Requirements for Vehicle Localization in Urban Environments," in Intelligent Transportation Systems (ITSC), 2015 IEEE 18th International Conference, Sep. 18, 2015, pages 712-718.

These methods cannot be applied in all possible circumstances, however, and it is therefore necessary to resort, for example, to less efficient algorithms. Dynamic effects, for example changing occupancy of parking spaces next to the roadway, as can occur especially in an urban environment (e.g., if the global localization map differs greatly from the local localization map), or cases in which map-relative localization is entirely impossible (e.g., in traffic jam situations), require particular map-matching approaches.

In the latter case, the entire simultaneous localization and mapping (SLAM) problem must be solved in order to make localization possible in the first place. For this, substantially simultaneous creation of a map, and localization based on the created map, are carried out. With this approach, the segment to be traveled is limited by drift in the posture estimate, and for that reason map-relative localization exhibits advantageous properties.

An intelligent system for road illumination was presented by Continental AG at the IST conference in 2016. The system presented there possesses a variety of environmental sensors and transmits information, for example regarding defective lamps, to a central data server. In a further expansion phase, a unit for communication with vehicle systems is also provided.

D. Meyer-Delius, J. Hess, G. Grisetti, W. Burgard, "Temporary maps for robust localization in semi-static environments," in Intelligent Robots and Systems (IROS), 2010 IEEE/RSJ International Conference, Oct. 18-22, 2010, pp. 5750-5722 discloses a system that performs a switchover between a conventional map-relative localization approach and a SLAM approach. A semi-static environment is detected, and a switchover between the two approaches recited above is carried out.

A plurality of approaches for sensor distribution planning (e.g., for monitoring tasks) are also described, for example, in Y. Zou, Krishnendu Chakrabarty, "Sensor deployment and target localization based on virtual forces," in INFOCOM 2003, Twenty-Second Annual Joint Conference of the IEEE Computer and Communications-IEEE Societies, Vol. 2, pp. 1293-1303, Vol. 2, 2003.

Japan Patent Application No. JP 2003524775 A describes a navigation device for a vehicle in which an adaptation of sensor data to digital map data corresponding to a current position of the vehicle can be carried out.

PCT Application No. WO 2015/156821 A1 describes a vehicle localization system having a first localization system, a second localization system, and a control device. The first localization system is embodied to localize the vehicle using first data; the second localization system is embodied to localize the vehicle using second data. The control device is embodied to switch over between the first and the second localization system if the first data are less than a predefined extent.

SUMMARY

An object of the present invention is to provide an improved system for locating a vehicle.

According to a first aspect the object is achieved with a method for locating a vehicle having the steps of:
 sensorial detection of first surroundings objects by the vehicle;
 locating the vehicle by reconciling data of the sensorially detected first surroundings objects with map data of a first digital map,
 in the case in which reconciliation of the data of the first surroundings objects with the map data of the first digital map to a defined extent is not possible, a second digital map for a local surroundings of the vehicle being created and location of the vehicle being carried out using the second digital map,
 data from second surroundings objects of an ascertaining device, which are conveyed from the ascertaining device to the vehicle, being used for creation of the second digital map.

A predictive switchover of localization modes, based on information from the local ascertaining device, is thereby advantageously supported. The result is that increased robustness and reliability can thereby achieved for a location system or localization system of the vehicle. Computation algorithms can thereby be adapted in targeted fashion to specific requirements and circumstances, the result being that computation power can be optimally utilized. Increased availability of a location system is thereby advantageously supported. As a result, the method therefore has the considerable advantage as compared with conventional systems that, inter alia, the required computation capacity and optimum switchover points in time for executing specific location algorithms are already known before the corresponding trajectory segment is traveled.

These approaches can be used in the context of the present invention in order to optimize a number, a distribution, and a utilization of surroundings sensors of the vehicle which are used.

According to a second aspect the present invention is achieved with an ascertaining device for furnishing location data for a vehicle, having:
- a sensor device for detecting defined surroundings objects;
- an evaluation device for evaluating data of the detected surroundings objects; and
- a conveying device for wirelessly conveying the evaluated data relating to the surroundings objects.

According to a third aspect the object is achieved with a vehicle having:
- a location device; and
- a switchover device for switching over an operating mode of the location device as a function of data that are received during operation of the vehicle and relate to defined surroundings objects from an ascertaining device.

Advantageous refinements of the method are described herein.

An advantageous refinement of the method provides that a defined reference system is used for creation of the second digital map. Conventional coordinate systems having known coordinates (e.g. Universal Transverse Mercator [UTM] coordinates), can thus be used to create the second digital map.

A further advantageous refinement of the present invention provides that substantially algorithms for sensorial detection of the second surroundings objects are used in order to locate the vehicle using the second digital map. As a result, the vehicle can sensorially detect objects actually present in a defined surroundings area, and can thereby effectively utilize computation capacity. The calculation algorithms can thereby be adapted in targeted fashion to specific circumstances.

A further advantageous refinement of the method provides that an initialization of the algorithms for sensorial detection of the second surroundings objects is carried out upon reception of the data of the second surroundings objects by the ascertaining device. This advantageously supports adaptation of the system to the new circumstances already at an early stage, i.e., as a modified surroundings condition is approached, and supports availability from the outset of full computation power for a modified location mode in the new surroundings. The result is that uninterrupted driving of the vehicle is thereby supported.

A further advantageous refinement of the method provides that the data relating to the second surroundings objects encompass at least a number of parked vehicles. The vehicle can thereby, for example when maneuvering in a residential area, carry out efficient location based on surroundings objects, in the form of parked vehicles, which are actually present.

The present invention is described in detail below, with further features and advantages, on the basis of several Figures. The Figures are intended principally to illustrate the main aspects of the present invention, and are not necessarily shown at exact scale.

Disclosed method features may be gathered analogously from corresponding disclosed apparatus features, and vice versa. This means in particular that features, technical advantages, and embodiments relating to the method may be gathered analogously from corresponding embodiments, features, and advantages relating to the ascertaining device and/or to the vehicle, and vice versa.

DETAILED DESCRIPTION OF EXAMPLE EMBODIMENTS

The term "automated motor vehicle" is used hereinafter with the synonymous meanings of "partly automated motor vehicle," "autonomous motor vehicle," and "partly autonomous motor vehicle."

The present invention encompasses in particular the planning and carrying out, predictively or at an early stage, a switchover of map-matching algorithms (algorithms for reconciling sensorially detected environmental data with map data from a digital map) and corresponding localization approaches. The accuracy, robustness, and necessary computation capacity of the localization module can thereby be advantageously influenced. Information from local ascertaining devices in the form of so-called "local cloud" systems, which ascertain specific data from surroundings objects, for example a number of parked vehicles along the roadway, traffic volume, house walls, hedges, etc., serves as an input variable for the system according to the present invention.

As a function of the aforesaid input variables, the example method in accordance with the present invention decides as to the map-matching and location approach to be used. In an advantageous manifestation, the decision is made on the basis of a stochastic model that describes a correlation among detectable landmarks, the matching algorithm being used, and localization accuracy. In a further possible manifestation, the decision is made based on empirically acquired practical values that are represented in the example system, for example, in the form of an expert system.

Figure 1:
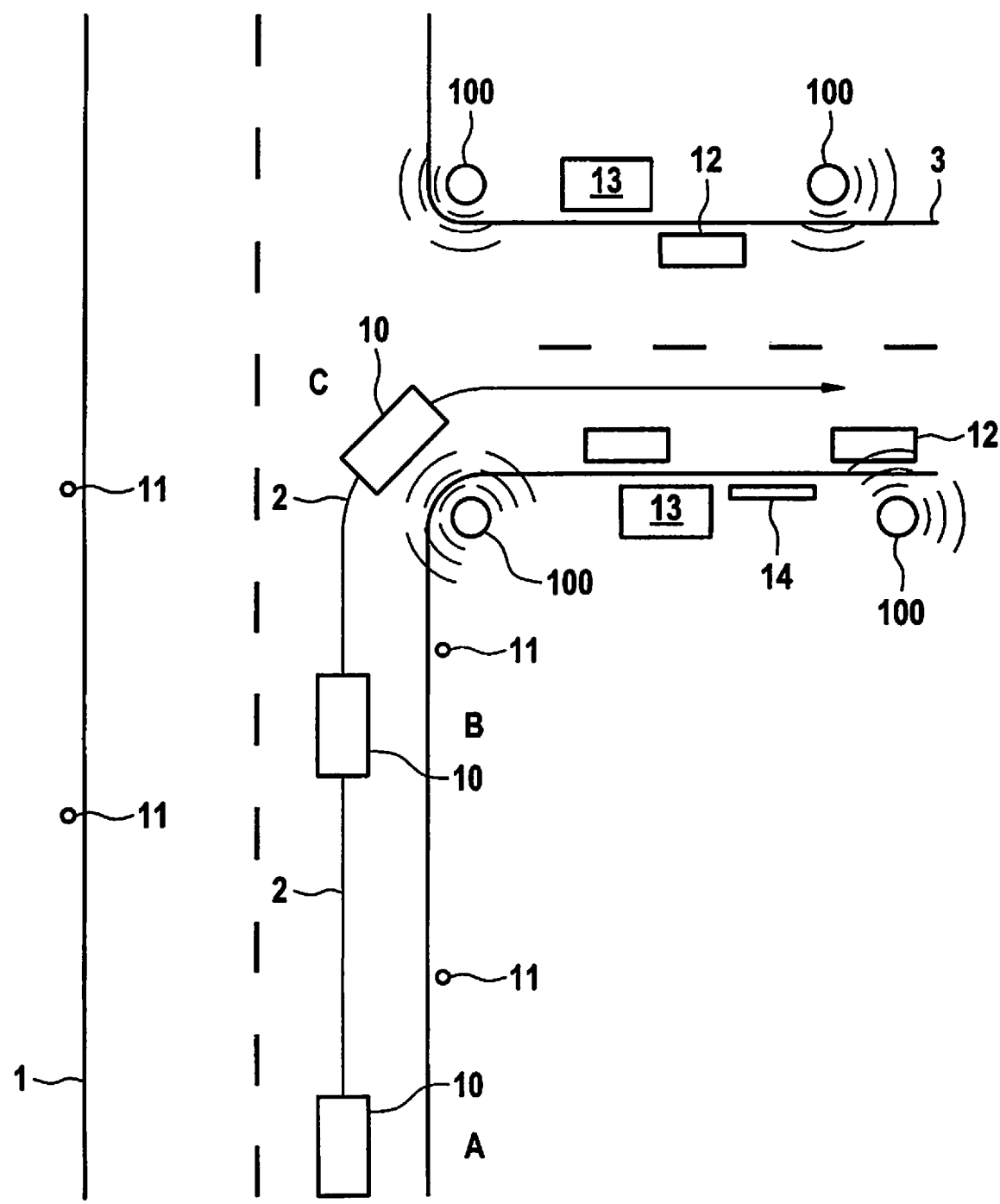
FIG. 1 schematically depicts a manner of operation of the method according to the present invention.

FIG. 1 shows a traffic scenario for which the example method according to the present invention is explained in principle. It shows an automated vehicle 10 moving along a trajectory 2 on a street 1. At a first position A, vehicle 10 is located on the basis of data of a first ("global") digital map 40, first surroundings objects 11 (e.g. posts, traffic signs, etc.) being detected sensorially with the aid of a sensor device (not depicted) of vehicle 10.

In a position B that is driven through next, vehicle 10 receives, from an ascertaining device 100 in the form of a local cloud system, specific data relating to second surroundings objects 12, 13, 14 on a road segment 3 onto which vehicle 10 then turns along trajectory 2. Road segment 3 is located, for example, in a densely built-up residential area with a large number of parked vehicles 12 along road segment 3. Data from surroundings objects, in the form of house walls 13 and/or hedges 14, are conveyed to vehicle 10 from ascertaining device 100. Preferably, at least data relating to a number of parked vehicles 12 are conveyed from ascertaining device 100. Additional second surroundings objects that are not depicted are also conceivable. As soon as the data of ascertaining device 100 relating to second surroundings objects 12, 13, 14 are received, vehicle 10 can no longer locate itself sufficiently using the data of first surroundings objects 11, for example because the number of first surroundings objects 11 along road segment 3 is substantially lower. Preferably it is possible to define quantitatively that degree of location capability by way of first surroundings objects and second surroundings objects 12, 13, 14 at which a switchover of the location mode is carried out.

As a result of the information conveyed by ascertaining device 100, in position B vehicle 10 can thus, at an early stage, switch over a straight-ahead location mode and now activates, for location purposes, algorithms that no longer predominantly sensorially detect first surroundings objects 11 and instead predominantly process surroundings objects 12, 13, 14 in the form of parked vehicles, house walls, hedges, etc. At the same time, starting at the moment at which the location mode is switched over, a second ("local") digital map 50 is created, by way of which vehicle 10 locates itself along road segment 3. What this means as a result is an early recognition of environmental situations in road segment 3, so that a location characteristic can be switched over at an early stage, so that computation capacity within vehicle 10 can advantageously be used efficiently.

Following departure from road segment 3, the location mode for detecting and processing first surroundings objects 11 can be activated again in vehicle 10. As a further alternative, it would also be conceivable to detect, by way of further ascertaining devices 100, further surroundings objects (not depicted) whose data cause an activation of algorithms of a further location mode (not depicted). The method is thus not limited to only two different location modes.

Figure 2:
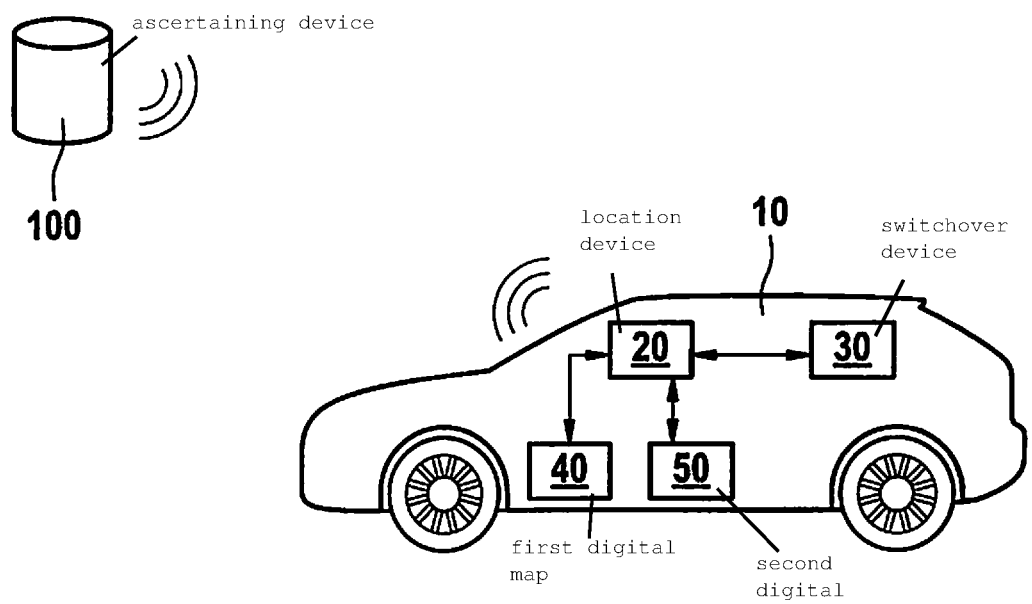
FIG. 2 is a simplified depiction of a proposed vehicle.

FIG. 2 is a highly simplified schematic depiction of an embodiment of a proposed vehicle 10. Visible in vehicle 10 is a location device 20 with which a localization of vehicle 10 is carried out. Location device 20 encompasses sensor elements known per se, for example lidar, radar, camera, etc. Location device 20 is functionally connected to a switchover device 30. In the event location device 20 wirelessly receives, from ascertaining device 100, data relating to second surroundings objects 12, 13, 14, location device 20 recognizes that a location mode can now be changed.

For that purpose, switchover device 30 switches over location algorithms within location device 20 so that localization is now carried out using correspondingly adapted algorithms of location device 20. Methods known per se can be used to switch over between the algorithms. The result is to achieve, already at an early stage during the operation of vehicle 10, a switchover of location algorithms and thus optimum utilization of computation capacity within vehicle 10.

An example system thus encompasses at least one ascertaining device 100 in the form of a local cloud system, receiving and transmitting units on the vehicle side, and a device for switching over algorithms for vehicle location, such that either map-matching algorithms, or algorithms for solving the SLAM problem, are executed as a consequence of the data conveyed from ascertaining device 100. Each vehicle 10 receives, from the local cloud systems along trajectory 2 that is being traveled, information regarding the expected surroundings.

Figure 3:
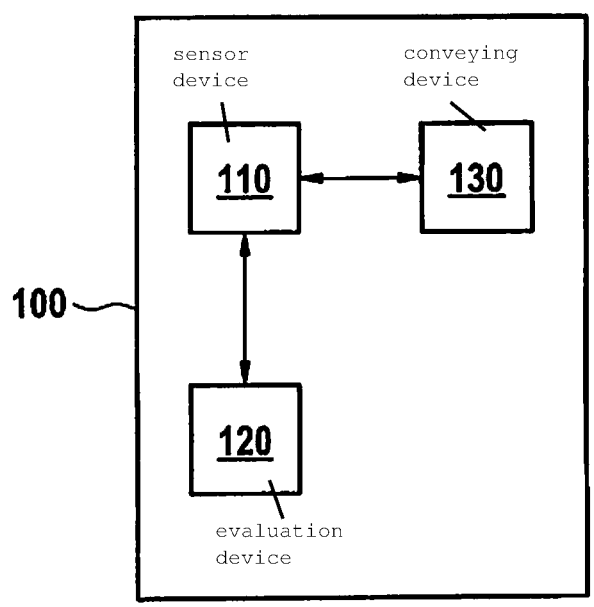
FIG. 3 is a simplified depiction of a proposed ascertaining device.

FIG. 3 is a simplified block diagram of a local ascertaining device 100, showing a sensor device 110 for detecting second surroundings objects 12, 13, 14 in the surroundings of ascertaining device 100. Using an evaluation device 120, the data are given basic processing and are conveyed wirelessly via a conveying device 130, preferably to a vehicle 10 for use in a location method. Also conceivable, however, are other receivers of the data conveyed from ascertaining device 100 relating to surroundings objects 12, 13, 14, for example for the purpose of evaluating traffic information.

Figure 4:
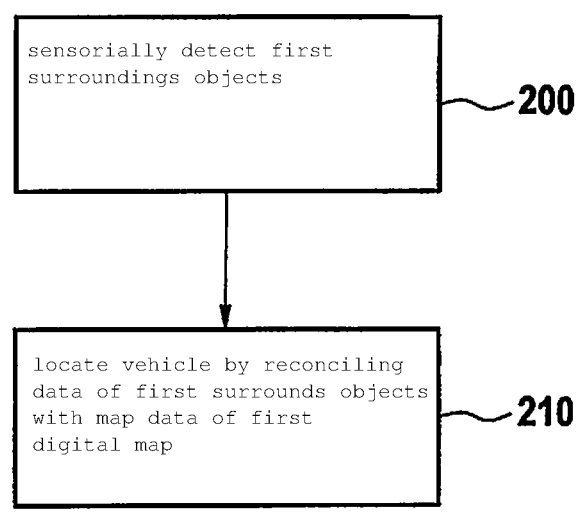
FIG. 4 schematically shows the execution of an embodiment of the method according to the present invention.

FIG. 4 schematically shows the execution of an embodiment of the proposed method.

In a step 200, first surroundings objects 11 are sensorially detected by vehicle 10.

In a step 210, vehicle 10 is located by reconciling data of sensorially detected first surroundings objects 11 with map data of a first digital map 40; in the event reconciliation of the data of first surroundings objects 11 with the map data of first digital map 40 to a defined extent is not possible, a second digital map 50 for a local surroundings of vehicle 10 is created and vehicle 10 is located using second digital map 50, second digital map 50 being created using data from second surroundings objects 12, 13 of an ascertaining device 100, which are conveyed from ascertaining device 100 to vehicle 10.

One skilled in the art will suitably modify the features of the invention, and/or suitably combine them with another, without departing from the essence of the present invention.

What is claimed is:

1. A method for locating a vehicle, the method comprising:
sensorially detecting, via a location device having sensor elements, at the vehicle, first surroundings objects by the vehicle;
locating, in a first location mode, the vehicle by reconciling data of the sensorially detected first surroundings objects with map data of a first digital map;
creating, in the case in which reconciliation of the data of the first surroundings objects with the map data of the first digital map to a defined extent is not possible, a second digital map for a local surroundings of the vehicle and carrying out a locating of the vehicle using the second digital map from an ascertainment device, which is located externally to the vehicle; and
creating, using data relating to second surroundings objects received from the ascertaining device, which are conveyed from the ascertaining device to the vehicle, the second digital map;
wherein the ascertaining device is located externally to the vehicle,
wherein the location device is functionally connected to a switchover device, and wherein when the location device receives from the ascertaining device the data relating to the second surroundings objects, the location device recognizes that the first location mode can be changed to a second location mode using the second digital map, and the switchover device switches the operating mode of the location device from the first location mode to the second location mode,
wherein the ascertaining device includes a sensor device for sensing the second surrounding objects, an evaluation device to process the data, and a conveying device to convey wirelessly the data of the second surroundings objects to the vehicle, and
wherein the switchover device is for switching over the operating mode of the location device as a function of the data of the second surrounding objects that are received during operation of the vehicle from the ascertaining device.

2. The method as recited in claim 1, wherein a defined reference system is used for creation of the second digital map.

3. The method as recited in claim 1, wherein algorithms for sensorial detection of the second surroundings objects are used to locate the vehicle using the second digital map.

4. The method as recited in claim 3, wherein an initialization of the algorithms for sensorial detection of the second surroundings objects is carried out upon reception of the data of the second surroundings objects by the ascertaining device.

5. The method as recited in claim 1, wherein the data relating to the second surroundings objects encompasses at least a number of parked vehicles.

6. An ascertaining device for furnishing location data for a vehicle, comprising:
   a sensor device for detecting defined surroundings objects;
   an evaluation device for evaluating data of the detected surroundings objects, by creating, in the case in which reconciliation of the data of the first surroundings objects with the map data of the first digital map to a defined extent is not possible, a second digital map for a local surroundings of the vehicle and carrying out a locating of the vehicle using the second digital map, and creating, using data from second surroundings objects of an ascertaining device, which are conveyed from the ascertaining device to the vehicle, the second digital map; and
   a conveying device for wirelessly conveying the evaluated data relating to the surroundings objects;
   wherein the ascertaining device is located externally to the vehicle,
   wherein a location device of the vehicle is functionally connected to a switchover device of the vehicle, and wherein when the location device receives from the ascertaining device the data relating to the second surroundings objects, the location device recognizes that the first location mode can be changed to a second location mode using the second digital map, and the switchover device switches the operating mode of the location device from the first location mode to the second location mode,
   wherein the sensor device of the ascertaining device uses the sensor device for sensing the second surrounding objects, the evaluation device to process the data, and the conveying device to convey wirelessly the data of the second surroundings objects to the vehicle, and
   wherein the switchover device of the vehicle is for switching over the operating mode of the location device as a function of the data of the second surrounding objects that are received during operation of the vehicle from the ascertaining device.

7. A vehicle, comprising:
   a location device; and
   a switchover device for switching over an operating mode of the location device as a function of data that are received during operation of the vehicle and relate to defined surroundings objects from an ascertaining device;
   wherein the ascertaining device is located externally to the vehicle and is for furnishing location data for the vehicle, and includes:
      a sensor device for detecting defined surroundings objects;
      an evaluation device for evaluating data of the detected surroundings objects, by creating, in the case in which reconciliation of the data of the first surroundings objects with the map data of the first digital map to a defined extent is not possible, a second digital map for a local surroundings of the vehicle and carrying out a locating of the vehicle using the second digital map, and creating, using data from second surroundings objects of an ascertaining device, which are conveyed from the ascertaining device to the vehicle, the second digital map; and
      a conveying device for wirelessly conveying the evaluated data relating to the surroundings objects;
   wherein a location device of the vehicle is functionally connected to the switchover device of the vehicle, and wherein when the location device receives from the ascertaining device the data relating to the second surroundings objects, the location device recognizes that the first location mode can be changed to a second location mode using the second digital map, and the switchover device switches the operating mode of the location device from the first location mode to the second location mode,
   wherein the sensor device of the ascertaining device uses the sensor device for sensing the second surrounding objects, the evaluation device to process the data, and the conveying device to convey wirelessly the data of the second surroundings objects to the vehicle, and
   wherein the switchover device of the vehicle is for switching over the operating mode of the location device as a function of the data of the second surrounding objects that are received during operation of the vehicle from the ascertaining device.

8. A non-transitory computer-readable data medium on which is stored a computer program, which is executable by a processor, comprising:
   a program code arrangement having program code for locating a vehicle, by performing the following:
      sensorially detecting, via a location device having sensor elements, at the vehicle, first surroundings objects by the vehicle;
      locating, in a first location mode, the vehicle by reconciling data of the sensorially detected first surroundings objects with map data of a first digital map;
      creating, in the case in which reconciliation of the data of the first surroundings objects with the map data of the first digital map to a defined extent is not possible, a second digital map for a local surroundings of the vehicle and carrying out a locating of the vehicle using the second digital map from an ascertainment device, which is located externally to the vehicle; and
      creating, using data relating to second surroundings objects received from the ascertaining device, which are conveyed from the ascertaining device to the vehicle, the second digital map;
   wherein the ascertaining device is located externally to the vehicle,
   wherein the location device is functionally connected to a switchover device, and wherein when the location device receives from the ascertaining device the data relating to the second surroundings objects, the location device recognizes that the first location mode can be changed to a second location mode using the second digital map, and the switchover device switches the operating mode of the location device from the first location mode to the second location mode, wherein the ascertaining device includes a sensor device for sensing the second surrounding objects, an evaluation device to process the data, and a conveying device to convey wirelessly the data of the second surroundings objects to the vehicle, and wherein the switchover device is for switching over the operating mode of the location device as a function of the data of the second surrounding objects that are received during operation of the vehicle from the ascertaining device.

* * * * *